UNITED STATES PATENT OFFICE.

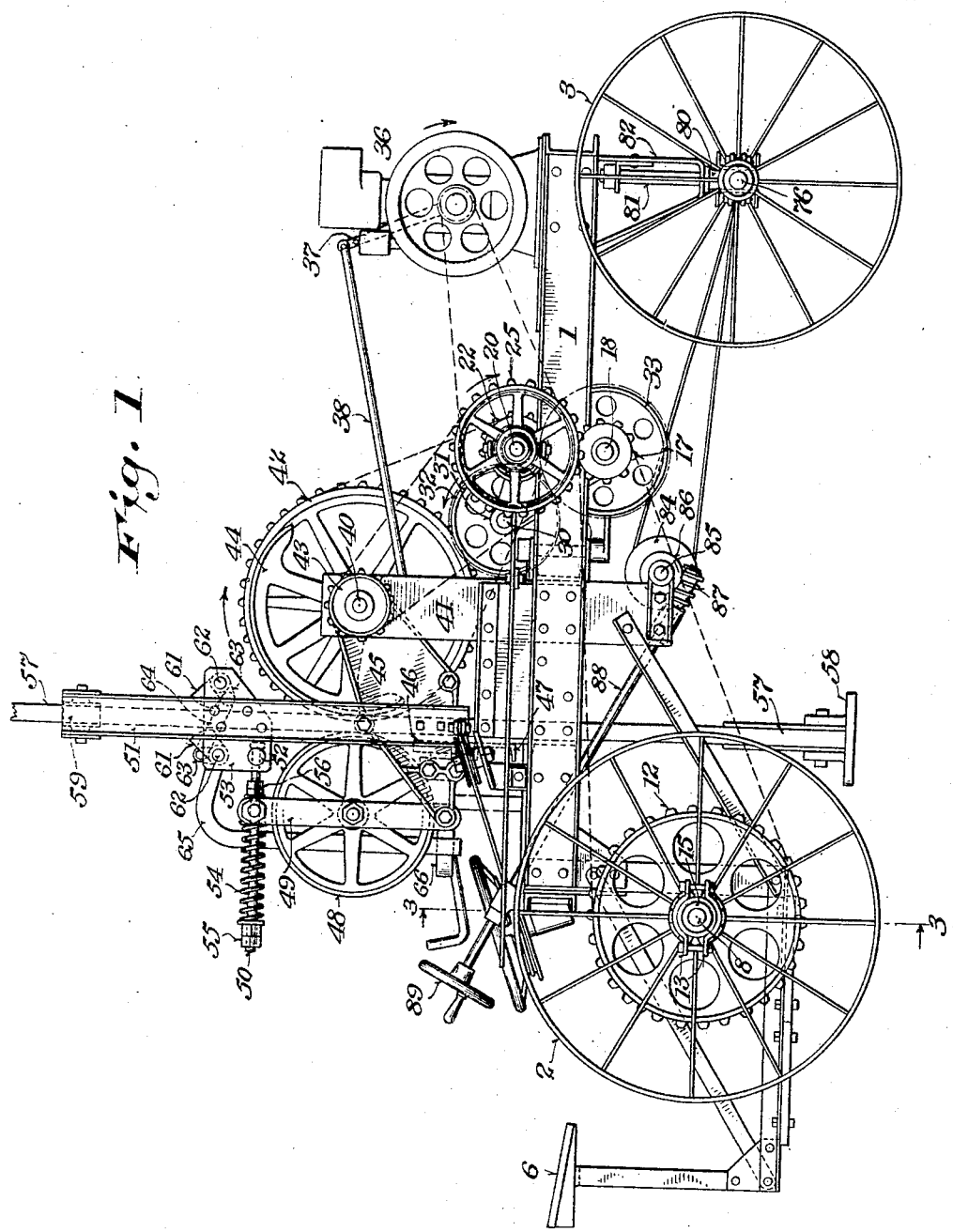

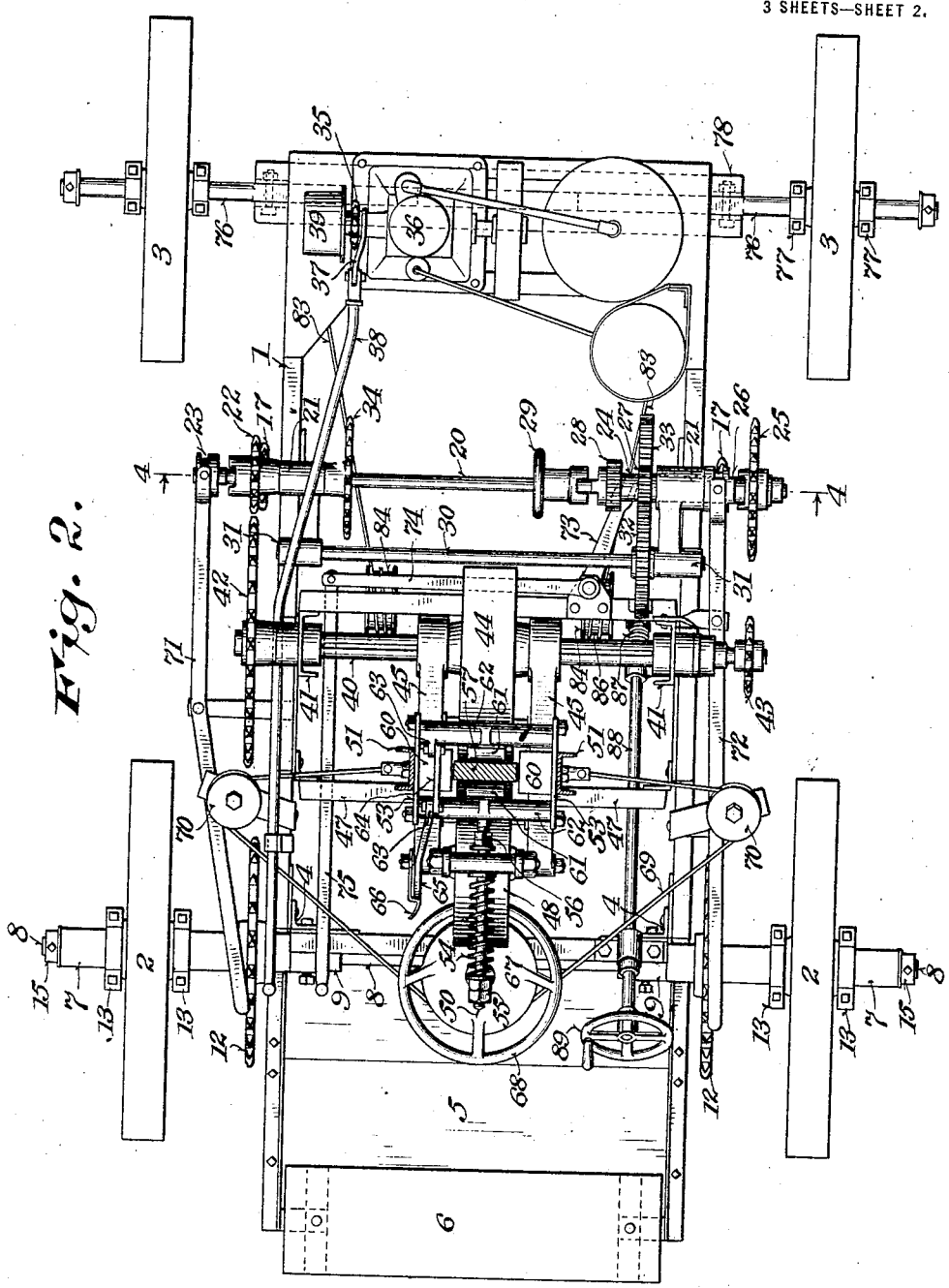

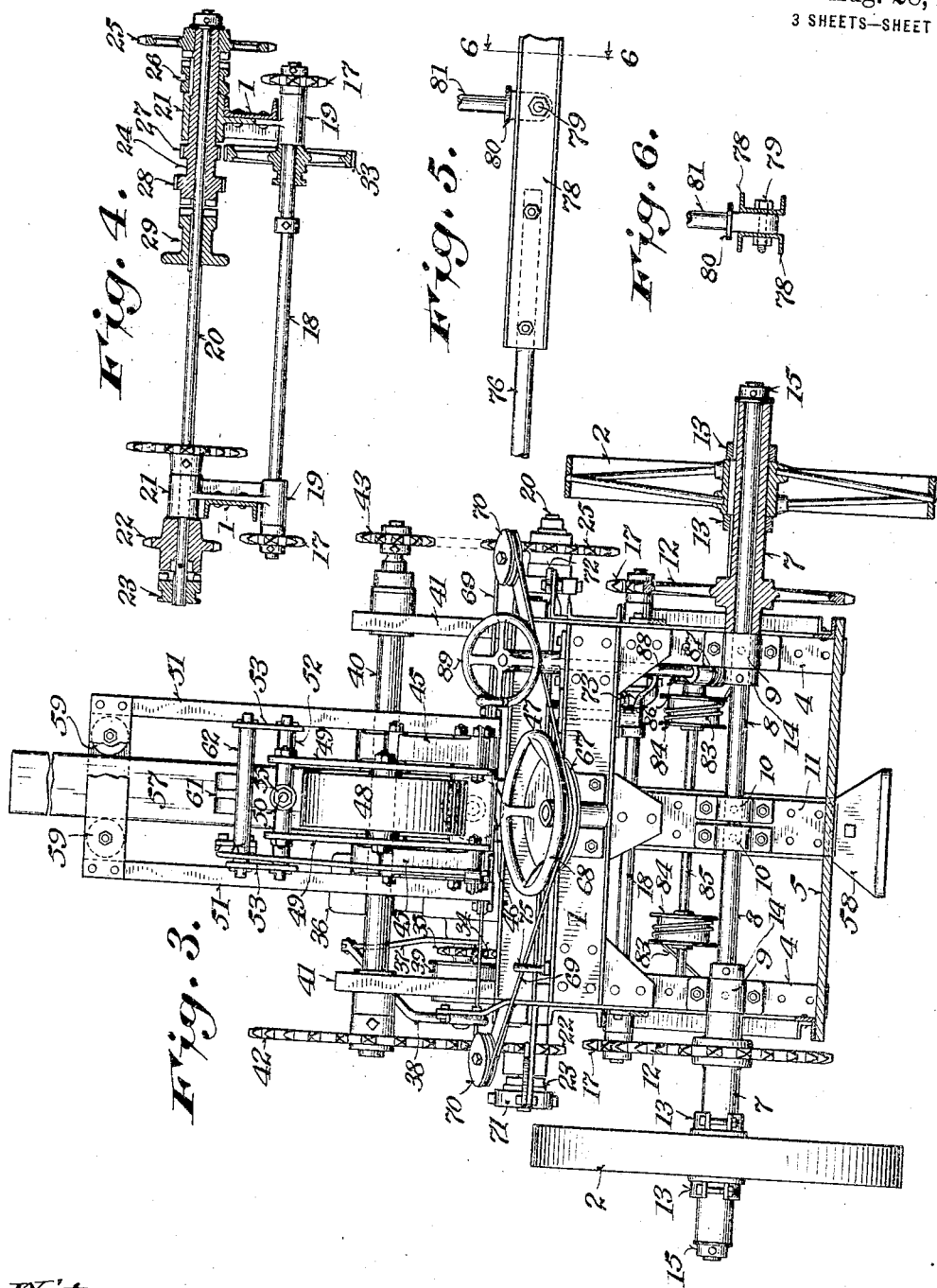

LEWIS WEHNER, OF MILWAUKEE, WISCONSIN, ASSIGNOR TO PAWLING AND HARNISCH-FEGER COMPANY, OF MILWAUKEE, WISCONSIN, A CORPORATION OF WISCONSIN.

TAMPING-MACHINE.

1,238,227.  Specification of Letters Patent.  Patented Aug. 28, 1917.

Application filed December 4, 1914.  Serial No. 875,495.

*To all whom it may concern:*

Be it known that I, LEWIS WEHNER, a subject of the Empire of Germany, residing at Milwaukee, in the county of Milwaukee and State of Wisconsin, have invented certain new and useful Improvements in Tamping-Machines, of which the following is a specification, reference being had to the accompanying drawing, forming a part thereof.

The main objects of this invention are to facilitate the operation of tamping dirt, concrete or the like, wherever it may be desired to compact such materials, as in filling trenches, making roads, etc.; to automatically move the machine forward or backward over the ground while the tamping mechanism is in operation; to provide for propelling the machine from place to place when at a higher speed the tamping mechanism is inactive; to provide for the adjustment of the traction wheels to keep the tamper in a substantially vertical position when the machine is working on more or less sloping or inclined roadways or surfaces; and generally to improve the construction and operation of machines of this class.

The invention consists in the construction, arrangement and combination of parts as hereinafter particularly described and pointed out in the claims.

In the accompanying drawing like characters designate the same parts in the several figures.

Figure 1 is a side elevation of a tamping machine embodying the invention; Fig. 2 is a plan view of the same; Fig. 3 is a rear end elevation as viewed from the left relative to Fig. 1, one of the traction wheels and the operator's platform being shown in section; Fig. 4 is a vertical section on the line 4—4, Fig. 2; Fig. 5 is a partial side elevation of the front axle; and Fig. 6 is a cross section on the line 6—6, Fig. 5.

The machine comprises a carriage having a frame 1, mounted on rear traction wheels 2 and front steering wheels 3. The frame, which may be conveniently constructed of channel iron as shown, is provided at the rear end with hangers 4, to the lower ends of which the operator's platform 5, is attached, the platform being provided on the rear side with a seat 6. The hubs of the traction wheels 2 are keyed or feathered on and adjustable lengthwise of sleeves 7, which are mounted on the projecting ends of the parts or sections 8, of a divided or two-part axle, the parts or sections of the axle being connected with the frame by boxes or brackets 9 and 10, bolted to and vertically adjustable on the hangers 4 and an intermediate hanger 11, as shown in Fig. 3. The traction wheels and the axle sections on which they are mounted are thus adjustable vertically independently of each other, so as to maintain the carriage frame 1 in an approximately horizontal position when the machine is working on the side of an arched or crowned roadway, or on an inclined or sloping surface.

The sleeves 7 are formed or provided adjacent to their inner ends with sprocket wheels 12, and the traction wheels 2 are secured in adjusted position on the sleeves by split clamping collars 13. The axle sections 8 are held in place in the boxes or brackets 9 and 10, and the sleeves 7 are confined in place on the outwardly projecting ends of the axle sections, by collars 14 and 15. The sprocket wheels 12 are connected as shown in Fig. 1, by link belts with sprocket wheels 17 on the ends of a transverse shaft 18, which may be called the traction shaft, and is supported in suitable bearings 19, on the under side of the frame 1, as shown in Fig. 4. Directly above and parallel with the shaft 18, another transverse shaft 20, which may be called the transmission shaft, is supported in bearings 21, which may be made as shown in Fig. 4, integral with the bearings 19, and riveted or bolted to the side members of the frame 1. The shaft 20 is provided at one end with a sprocket wheel 22, loosely mounted thereon, and a jaw clutch 23, which is keyed or feathered and movable lengthwise of the shaft into and out of engagement with said sprocket wheel.

A sleeve 24, in which the opposite end of the shaft 20 is rotatably fitted and which in turn is rotatably fitted in the adjacent bearing 21 as shown in Fig. 4, is provided at its outer end with a loose sprocket wheel 25, and with a jaw clutch 26, for operatively connecting said sprocket wheel and sleeve. On the inner side of said bearing 21 the sleeve 24 is provided with gears 27 and 28.

The shaft 20 is provided with a jaw clutch 29, for operatively and directly connecting it with said sleeve.

Behind and parallel with the shaft 20 another transverse shaft 30, which may be called a counter shaft, is mounted in suitable bearings 31, which may be cast as shown, integral with the bearings 19 and 21. The shaft 30 is provided with a gear 32, which meshes with the gear or pinion 27 on the sleeve 24, as shown in Fig. 2. The shaft 18, as shown in Fig. 4, has a gear 33, keyed or feathered thereon, and shiftable lengthwise thereof into engagement with the gear or pinion 28 on the sleeve 24, or with the gear 32 on the counter shaft 30, as indicated by dotted lines in Fig. 1.

The shaft 20 is provided with a sprocket wheel 34, which is connected by a link belt, as indicated in Fig. 1, with a sprocket wheel 35, shown in Fig. 2 on the shaft of a motor 36, mounted on the front end of the frame 1. The sprocket wheel 35 is preferably loosely mounted on the motor shaft, and is operatively connected therewith by a clutch controlled by a lever 37 and a connecting rod 38 extending backward to the rear end of the machine within convenient reach of the operator's platform or seat.

The motor shaft may also be provided with a pulley 39, for driving other machinery, if desired.

Above and parallel with the shaft 20, another shaft 40, which may be called the tamper shaft, is supported by bearings on uprights 41, attached to the side members of the frame 1. At one end this shaft is provided with a sprocket wheel 42, which is connected as indicated in Fig. 1, by a link belt, with the sprocket wheel 22 on the shaft 20. At the other end the shaft 40 is provided with a sprocket wheel 43, which is connected by a link belt as indicated in Fig. 1, with the sprocket wheel 25 on the sleeve 24.

A segment wheel 44 is loosely keyed or feathered on the shaft 40, and movable lengthwise thereof between the standards 41. The wheel 44 is confined between and movable with the side members of a frame 45, which is supported and guided at its front end on the shaft 40 and is supported adjacent to its rear end by a roller 46 journaled on a cross member of said frame and adapted to rest and travel on a cross piece 47 of the frame 1, as shown in Figs. 1 and 3.

A full or complete friction wheel 48 is mounted on an axis opposite and parallel with the axis of the segment wheel 44 in a vertically disposed frame 49, hinged or pivoted at its lower end to the tamper frame 45, and yieldingly connected at its upper end by a rod 50 with uprights 51, attached to and extending upwardly from the side members of the tamper frame. The rod 50, passing loosely through a cross piece at the upper end of the frame 49 is fastened at its front end to a rocker pin 52, which is pivoted in plates 53 attached parallel with each other to the uprights 51. A spiral spring 54, placed on the rod 50 between the upper end of the frame 49, and a washer and nuts 55 on the outer end of said rod, tends to throw the wheel 48 toward the segment wheel 44, and stop and jam nuts 56, threaded on said rod between the frame 49 and the rocker pin 52, limit the movement of the wheel 48 toward the segment wheel 44.

A tamper consisting of a vertical bar 57, made of hard wood, and a metal shoe or head 58 attached to its lower end, is guided in the frame 45 by rollers 59 at the upper ends of the uprights 51, and blocks or cheek pieces 60, on the side members of the frame 45. These guide blocks or cheek pieces are preferably made separate from the side members of the tamper frame to which they are attached, so that they can be easily renewed or replaced when they become worn.

To support the tamper in an elevated position for running the machine from place to place when the tamper actuating mechanism is not in operation, a pair of locking jaws 61, are mounted on rocker shafts 62, which are pivoted on opposite sides of the tamper bar 57 in the plates 53. These shafts are provided with arms 63, which are connected by a link 64, and one of the shafts is provided with an elbow-shaped lever 65, projecting downwardly into convenient reach of the operator for simultaneously turning the jaws into and out of engagement with the tamper bar.

A spring catch 66, attached to the tamper frame, is adapted by engagement with the lever 65 to hold the jaws out of engagement with the tamper bar, as shown in Figs. 1 and 2. In this position the jaws serve as guides for the tamper bar.

A drum 67, provided with a hand wheel 68, is pivotally mounted on the rear cross piece of the frame 1, within convenient reach of the operator, and is connected by a cable 69 passing around sheaves 70, mounted on the sides of the frame 1, with opposite sides of the tamper frame 45. Forked levers 71 and 72, fulcrumed to brackets on opposite sides of the frame 1, are connected at their front ends with the clutches 23 and 26, and extend rearwardly to the operator's platform.

A lever fulcrumed on a cross piece of the frame 1, has a forked arm 73, pivotally connected with the grooved hub of the shiftable reversing gear 33, and a longer arm 74, extending across the machine and pivotally connected with an operating rod 75, extending rearwardly therefrom to the operator's platform. The steering wheels 3 are mounted on and adjustable lengthwise of round axle spindles 76, and are held in adjusted position thereon by clamping collars 77, for changing the gage of the carriage or the distance between the wheels.

The spindles 76 have squared or flattened shanks, which are bolted between parallel channel bars 78. The channel bars 78 are centrally connected by a transverse pivot pin 79, as shown in Figs. 5 and 6, with the head 80 on the lower end of a king bolt 81, which is swiveled in a bracket 82, attached to and depending from the front end of the frame 1. The front axle is thus pivotally connected with the carriage frame, so that it can tip vertically relative thereto, according to the vertical adjustment of the traction wheels 2, and according to inequalities in the roadway or ground on which the machine travels, and can also swing horizontally for steering the machine. The front axle is connected on opposite sides of and equidistant from the king bolt 81 by cables 83, with drums 84, on a transverse shaft 85, supported in bearings on the lower ends of the standards 41, said cables being wound in opposite directions on the drums. The shaft 85 is provided with a worm gear 86, engaged by a worm 87 on a shaft 88, which extends upwardly and rearwardly, and is provided at its rear end over the operator's platform, with a hand wheel or crank 89.

In the operation of the machine the sprocket wheel 35 being connected with the motor shaft, rotates the transmission shaft 20. To simultaneously actuate the tamper and slowly move the machine forward or backward, the clutch 23 is engaged with the sprocket wheel 22, and the clutch 26 is engaged with the sprocket wheel 25, the clutch 29 being disengaged, as shown in Figs. 2 and 4, from the sleeve 24. The tamper shaft 40, with the segment wheel 44, is rotated in the same direction as the transmission shaft 20, by the link belt connecting the sprocket wheel 22 with the sprocket wheel 42. The segment wheel 44, coöperating with the yielding friction wheel 48, alternately lifts and drops or releases the tamper, the jaws 61 being thrown and held by the lever 65 and the spring catch 66, out of engagement with the tamper bar 57. When the gear 33 is in the position in which it is shown in Figs. 2 and 4, the machine will be driven slowly forward, the sleeve 24 being turned in the same direction as the shaft 20, but at a much slower speed, by the link belt connecting the sprocket wheel 43 with the sprocket wheel 25. From the sleeve 24, motion is communicated to the traction wheels 2 by the gear or pinion 27, meshing with the gear 32 on the shaft 30, which is thus rotated in the opposite direction, as indicated by arrows on Fig. 1. The gear 32, meshing with the gear 33 on the traction shaft 18, turns said shaft in the same direction as the shaft 20, and through the link belts connecting the sprocket wheels 17 with the sprocket wheels 12, the traction wheels 2 are turned forward.

To reverse the movement of the machine, the rod 75 is drawn backward, thereby shifting the gear 33 from engagement with the gear 32, into engagement with the gear or pinion 28, whereupon the traction shaft 18 and the traction wheels 2, will be slowly turned backward.

As the machine is slowly moved forward or backward, the tamper is shifted with the frame 45 and lifting wheels 44 and 48, back and forth across the carriage by turning the hand wheel 68 first in one direction and then in the other. The tamper shoe is thus caused to traverse a zigzag path covering a space of more or less width, as required.

To run the machine from one place to another at a higher speed without operating the tamping mechanism, the jaws 61 are turned into engagement with the tamper bar 57 when the head 58 is in an elevated position, by disengaging the spring catch 66 from the lever 65 and pulling said lever backward, and the clutches 23 and 26 are shifted out of engagement with the sprocket wheels 22 and 25, as shown in Figs. 2 and 4, and the clutch 29 is shifted into engagement with the sleeve 24, thereby directly connecting said sleeve with the shaft 20 and cutting out the tamper shaft 40 and the tamper actuating wheels 44 and 48.

When the gear 33 is in the position shown by Figs. 2 and 4, the traction wheels 2 will be turned forward at a more rapid rate than before, and the machine will be driven forward, being steered the same as when it is propelled at a slower rate of speed for tamping, by means of the hand wheel or crank 89 and its connections with the front axle. The machine may be run backward without operating the tamping mechanism, by shifting the gear 33 from engagement with the gear 32 into engagement with the gear or pinion 28, as hereinbefore explained.

The tamper actuating mechanism is adjusted to properly grip, lift and release the bar 57 by the adjustment of the nuts 55 to vary the tension of the spring 54 as may be required, and by the adjustment of the stop and jam nuts 56, so that when the bar 57 is gripped between the segment wheel 44 and the wheel 48, as shown in Fig. 1, there will be a slight play or clearance, say, of $\frac{1}{16}$ of an inch, between the stop nut and the washer against which it bears, and the cross member at the top of the pivoted frame 49 through which the rod 50 passes.

For spanning wide trenches or the like, the traction wheels 2 and steering wheels 3, are shifted outward on the sleeve 7 and spindles 76, by loosening the clamping collars 13 and 77 and then tightening them in their adjusted positions.

The wheels are in like manner adjusted inwardly on either or both sides when it is necessary, in order to clear a curb or other obstruction in tamping dirt or the like in a trench or otherwise near such curb or obstruction.

When the machine is used on the side of a crowned roadway or on a sloping or inclined surface, the traction wheel on either side of the machine may be raised or lowered, or the wheel on one side may be raised and the wheel on the other side lowered to approximately level the carriage frame 1 and maintain the tamper bar 57 in a vertical position, by removing the bolts from one or both sets of boxes or brackets 9 and 10, and setting them up or down as required, on the hangers 4 and 11, which are formed for this purpose with a vertical series of bolt holes for each box or bracket. The front axle will tip more or less on its pivot pin 79, according to the adjustment of the axle sections 8 up or down, out of alinement with each other.

When the tamping mechanism is not in use and the machine is standing, the motor 36 may be utilized to operate another machine by connecting it with the belt pulley 39 on the motor shaft.

Various changes in details of construction and in the arrangement of parts of the machine may be made without departure from the principle and scope of the invention as defined in the following claims.

The term "feathered" as used herein is intended to include any equivalent construction whereby a wheel or the like is connected with a shaft or the like so as to compel them to rotate together and at the same time permit axial movement or adjustment of one relative to the other.

I claim:

1. In a tamping machine the combination of a segment wheel, an opposing yielding wheel having its axis parallel with and movable toward and from the axis of the segment wheel, a vertically movable tamper guided between said wheels and adapted to be alternately lifted and released thereby, and means for rotating said segment wheel.

2. In a tamping machine the combination of a tamper frame, a segment wheel mounted in said frame, a wheel frame mounted on the tamper frame and movable toward and from the segment wheel, a stop for limiting the movement of the wheel frame toward the segment wheel, a spring tending to move said frame toward the segment wheel, a wheel mounted on an axis in said wheel frame opposite and parallel with the axis of the segment wheel, a vertically movable tamper guided in the tamper frame between said wheels and adapted to be alternately lifted and released thereby, and means for rotating said segment wheel.

3. In a tamping machine the combination of a tamper frame, a segment wheel mounted in said frame, a wheel frame connected with the tamper frame and movable toward and from the segment wheel, an adjustable stop limiting the movement of the wheel frame toward the segment wheel, a spring tending to press said frame toward the segment wheel, means for adjusting the tension of said spring, a wheel mounted on an axis in said wheel frame opposite and parallel with the axis of the segment wheel, a vertically movable tamper guided in the tamper frame between said wheels and adapted to be alternately lifted and released thereby, and means for rotating said segment wheel.

4. In a tamping machine the combination of a main frame, a shaft journaled in said frame, a tamper frame mounted on the main frame and movable lengthwise of said shaft, a segment wheel movable with the tamper frame on and lengthwise of said shaft on which said wheel is feathered, a wheel mounted on an axis in the tamper frame opposite and parallel with the axis of the segment wheel, a vertically movable tamper guided in the tamper frame between said wheels and adapted to be alternately lifted and dropped thereby, and means for rotating said shaft and segment wheel.

5. In a tamping machine the combination of a main frame, a shaft journaled in said frame, a tamper frame guided and movable lengthwise of said shaft, a segment wheel movable with the tamper frame lengthwise of said shaft on which said wheel is feathered, a wheel mounted on an axis in the tamper frame opposite and parallel with the axis of the segment wheel, a vertically movable tamper guided in the tamper frame between said wheels, which are adapted to alternately lift and release the same, means for rotating said shaft and segment wheel, and means for moving the tamper frame lengthwise of said shaft.

6. In a tamping machine the combination of a carriage provided with traction wheels and a transverse tamper actuating shaft, a tamper frame movable on the carriage lengthwise of said shaft, a vertically movable tamper guided in said frame, a segment wheel for lifting the tamper movable therewith lengthwise of said shaft on which said wheel is feathered, means for moving the tamper frame across the carriage, a transmission shaft mounted on the carriage parallel with the tamper actuating shaft and having a clutch controlled driving connection therewith, a sleeve rotatably mounted on the transmission shaft and having a clutch controlled connection with the tamper actuating shaft, a clutch for directly connecting said sleeve with the transmission shaft, reversing gearing connecting said sleeve with the traction wheels, and a motor connected with the transmission shaft.

7. In a tamping machine the combination of a carriage frame, tamping mechanism mounted thereon and comprising a vertically movable tamper and means for alternately lifting and releasing the same, separate axle sections vertically adjustable independently of each other on said frame, traction wheels mounted on the axle sections and adjustable lengthwise thereof, and a motor mounted on the carriage and having driving connections with said wheels.

8. In a tamping machine the combination of a carriage frame, tamping mechanism mounted thereon and comprising a vertically movable tamper and means for alternately lifting and releasing the same, axle sections mounted on and projecting from each side of the frame and vertically adjustable independently of each other, sleeves mounted on the axle sections and provided with sprocket wheels, traction wheels mounted on and adjustable lengthwise of the said sleeves, a traction shaft mounted on the carriage frame parallel with the axle sections and provided with sprocket wheels which are connected by link belts with the sprocket wheels on said axle sleeves, and a motor adapted to actuate said traction shaft.

In witness whereof I hereto affix my signature in presence of two witnesses.

LEWIS WEHNER.

Witnesses:
  CHAS. L. GOSS,
  FRED PALM.

Copies of this patent may be obtained for five cents each, by addressing the "Commissioner of Patents, Washington, D. C."